United States Patent
Lai et al.

(10) Patent No.: US 9,584,370 B2
(45) Date of Patent: Feb. 28, 2017

(54) NETWORK CARD WITH SEARCHING ABILITY, MONITORING DEVICE WITH THE NETWORK CARD, AND SEARCHING METHOD USED FOR THE SAME

(71) Applicant: DELTA ELECTRONICS, INC., Taoyuan County (TW)

(72) Inventors: Chun-Fu Lai, Taoyuan County (TW); Chung-Pao Lin, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 127 days.

(21) Appl. No.: 14/332,902

(22) Filed: Jul. 16, 2014

(65) Prior Publication Data
US 2015/0215170 A1    Jul. 30, 2015

(30) Foreign Application Priority Data
Jan. 27, 2014    (TW) .............................. 103102916 A (51) Int. Cl.
G06F 13/00    (2006.01)
H04L 12/24    (2006.01)
H04L 12/26    (2006.01)

(52) U.S. Cl.
CPC ............ *H04L 41/12* (2013.01); *H04L 43/045* (2013.01); *H04L 43/065* (2013.01); *H04L 43/0811* (2013.01)

(58) Field of Classification Search
CPC ... H04L 29/08072; H04L 29/06; H04L 43/00; H04L 12/2602; H04L 41/22;
(Continued)

(56) References Cited

U.S. PATENT DOCUMENTS 6,801,927 B1 * 10/2004 Smith .................... H04L 47/10
709/202
6,892,224 B2 * 5/2005 Strahm ............... G06F 17/3089
707/E17.116

(Continued)

FOREIGN PATENT DOCUMENTS

| CN | 101047717 | 10/2007 |
| WO | WO 01/55876 | 8/2001 |
| WO | WO 2007/073814 | 7/2007 |

OTHER PUBLICATIONS

Office Action dated Oct. 22, 2015 from corresponding No. TW 103102916.

*Primary Examiner* — Robert B Harrell
(74) *Attorney, Agent, or Firm* — Hauptman Ham, LLP (57) ABSTRACT

A network card with searching ability inquires connection information from all network cards at a network by using a broadcasting manner when it is connected to the same network, and build a connection list according to the received connection information. A user terminal can connect to a management page by one of the network cards on the network by a browser thereon, and check the connection list at the management page upon login successfully. User can obtain connection information of all network cards at the network through the connection list. Therefore, the user terminal can connect to a target network card according to the obtained connection information through a redirection manner. Else, it can also connect to the target network card via the logged network card through a relay manner.

20 Claims, 10 Drawing Sheets (58) Field of Classification Search
CPC ..... H04L 41/12; H04L 43/045; H04L 43/065; H04L 43/0811; G06F 3/1296; G06F 3/1297; H04N 1/00204; H04N 2201/0082; H04N 2201/0094
USPC ........................................ 358/1.15; 709/224
See application file for complete search history.

(56) References Cited

U.S. PATENT DOCUMENTS

| | | | |
|---|---|---|---|
| 7,051,087 B1 | 5/2006 | Bahl et al. | |
| 7,310,664 B1 * | 12/2007 | Merchant | H04L 41/0886 709/220 |
| 7,624,100 B1 | 11/2009 | Applegate et al. | |
| 2002/0035621 A1 * | 3/2002 | Zintel | H04L 12/2805 709/220 |
| 2004/0039821 A1 * | 2/2004 | Giglio | H04L 29/12216 709/227 |
| 2006/0050465 A1 * | 3/2006 | Cho | H02J 9/061 361/118 |
| 2009/0027725 A1 * | 1/2009 | Okazawa | H04L 63/10 358/1.15 |
| 2013/0286425 A1 * | 10/2013 | Nakamura | G06F 3/1204 358/1.13 |

* cited by examiner

NETWORK CARD WITH SEARCHING ABILITY, MONITORING DEVICE WITH THE NETWORK CARD, AND SEARCHING METHOD USED FOR THE SAME

BACKGROUND

1. Technical Field

The present disclosure relates generally to a network card and a monitoring device having the same, and more particularly to a network card with searching ability, a monitoring device having the network card, and a searching method used for the network card and the monitoring device.

2. Description of Related Art

In general, various apparatuses, such as the server host, the monitoring device, the uninterruptible power supply (UPS), or the gateway, usually have separated webpage interfaces. The network administrator connects to the webpage interfaces through the IP address of the used apparatuses and then monitors data of the apparatuses.

In the existing technologies, the network administrator has to record IP addresses of all apparatuses so as to connect to and login the webpage interface through the IP addresses. The dynamic host configuration protocol (DHCP) server is usually used to record IP addresses and manage the IP address allocation. However, it is inconvenient to coordinate the apparatuses to the allocated IP addresses.

In addition, the network administrator usually opens a browser and then inputs the corresponding IP addresses to connect to the webpage interfaces so that the network administrator can directly record the IP addresses of the apparatuses on the browser. However, the apparatuses would not correctly correspond to the IP addresses to result in invalid connections once the apparatus in the system is changed or the host is replaced.

In addition, an additional searching program is developed to be installed in the computer of the network administrator for conveniently searching IP address of the apparatuses. In some management conditions, however, the additional searching program cannot be installed in order to avoid the network security. Accordingly, it is difficult for the network administrator to manage and monitor data of the apparatuses.

SUMMARY

An object of the present disclosure is to provide a network card with searching ability, a monitoring device having the network card, and a searching method used for the network card and the monitoring device. After the user connects to any one network card or a management page of the monitoring device, the user can inquire the connection information of all network cards or monitoring devices on the same network by the management page.

Another object of the present disclosure is to provide a network card with searching ability, a monitoring device having the network card, and a searching method used for the network card and the monitoring device. After the user acquires the connection information of a target network card or a target monitoring device through any one network card or the management page of the monitoring device, the user can directly connect to the target network card or the target monitoring device by using a redirection manner, or execute a relay manner through the connected network card or the monitoring device so as to build a connection between the user and the target network card or the target monitoring device.

In order to achieve the above-mentioned object, the present disclosure is to provide a network card with searching ability and a monitoring device having the network card. When the network card is connected to the network, the network card inquires connection information of all network cards on the same network by using the broadcasting manner so as to build a connection list. The network card provides a management page, and a user terminal can connect to the management page provided any one network card by a browser thereof. Also, the connection list can be viewed on the management page to acquire connection information of other network cards by the connection list. Accordingly, the user terminal can connect to a target network card by a redirection manner according to the connection information. In addition, the user terminal can execute a relay service through the logined network card so as to build a connection between the user terminal and the target network card.

The technology features are as follows: each network card can acquire connection information of all network cards on the same network by a broadcasting manner so as to build the connection list. The user terminal can connect to a management page of any one network card through the browser so as to acquire connection information of all network cards on the same network by the management page, thus connecting to other network cards. Accordingly, the network administrator does not need to record the IP addresses of the used network cards, and the user does not need to know the used IP address of the target network card. Further, it does not need to install external software to search the IP addresses of the used network cards at the user terminal.

In addition, after the user terminal logins the management page of a network card and acquires the connection information of the target network card, both the redirection manner and the relay manner can be used. In other words, the user terminal can directly connect to the target network card by the redirection manner; or the user terminal can executes the relay service through the logined network card. Hence, the user terminal can connect to the target network card through the connected network card. Accordingly, the user terminal can connect to any one network card and then find the target network card and build a connection with the target network card whether the user terminal and the target network card is located on the same network or not.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Reference will now be made to the drawing figures to describe the present invention in detail.

Figure 1:
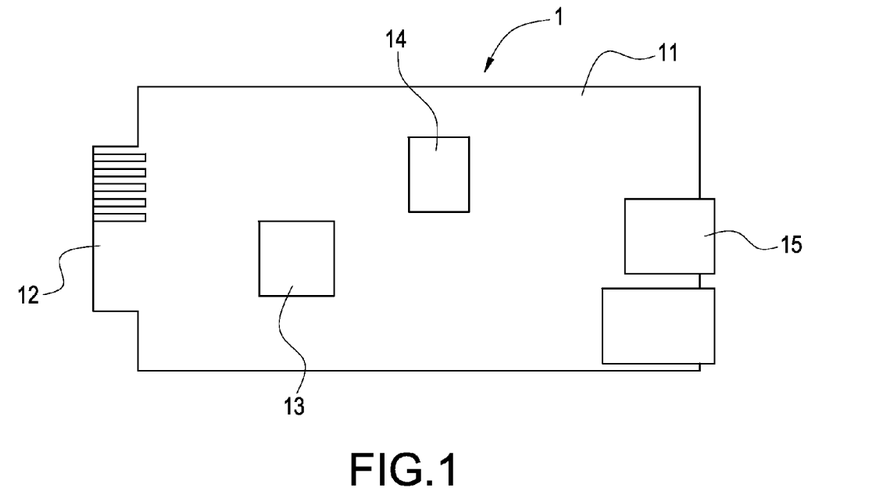
FIG. 1 is a schematic view of a network card according to a first embodiment of the present disclosure.
Figure 2:
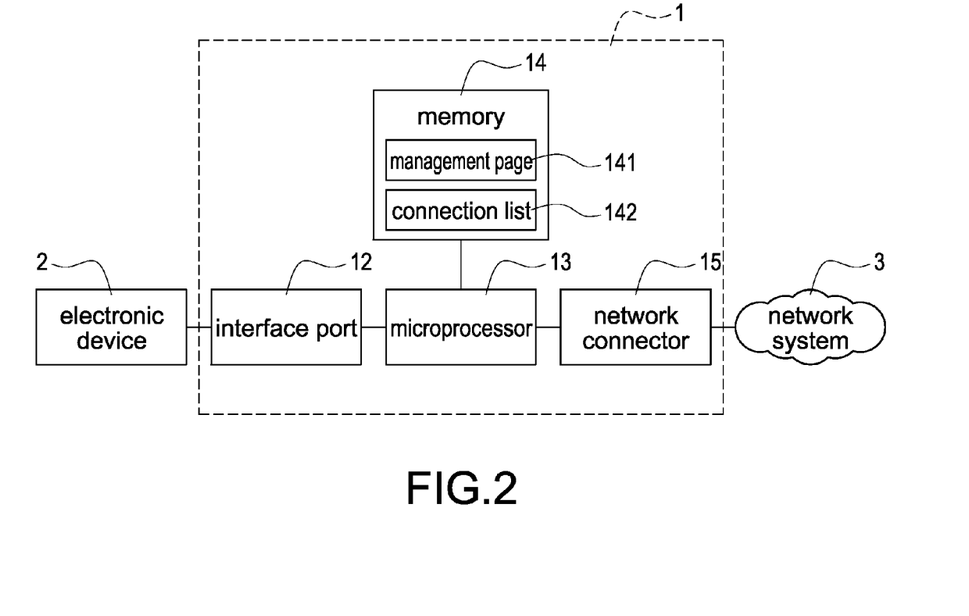
FIG. 2 is a block diagram of the network card according to the first embodiment of the present disclosure.

Reference is made to FIG. 1 and FIG. 2 which are a schematic view and a block diagram of a network card according to a first embodiment of the present disclosure, respectively. The present disclosure discloses a network card 1 with a searching ability, and the network card 1 is installed in an electronic device 2, and the network card 1 receives the required power of operating thereof from the electronic device 2 and provides the networking function for the electronic device 2. In this present disclosure, the electronic device 2 can be one of various server hosts. When the electronic device 2 is installed in a server cabinet (not shown), the network card 1 can connect to the network switch or the router in the server cabinet through the network cable so that the electronic device 2 is connected to the network through the network card 1. Accordingly, the user can connect to the electronic device 2 through the network to monitor and acquire data of the electronic device 2.

As shown in FIG. 1, the network card 1 mainly includes a circuit board 11, an interface port 12, a microprocessor 13, a memory 14, and a network connector 15. The interface port 12, the microprocessor 13, the memory 14, and the network connector 15 are mounted on the circuit board 11. Also, the interface port 12, the memory 14, and the network connector 15 are electrically connected to the microprocessor 13.

The network card 1 is electrically connected to the electronic device 2 through the interface port 12, and the electronic device 2 receives the required power for operations. The network card 1 is connected to external network cable through the network connector 15, and further connected to a network switch or a router through the network cable. The electronic device 2 with the network card 1 is connected to a network system 3 through the network card 1. In this embodiment, the network connector 15 can be a RJ-45 connector; the network card 1 can be a general network card or a simple network management protocol (SNMP) card. However, the embodiments are only exemplified but are not intended to limit the scope of the disclosure.

In this embodiment, the network card 1 records a management page 141 and a connection list 142 in the memory 14. The management page 141 is a web-based webpage. The connection list 142 records the connection information of all network cards which are connected to the same network with the electronic device 2, namely, the network card 1. Hence, the network card 1 can be connected through the network to build and operate the management page 141 as long as the user knows that the used IP address of the network card 1, and further the user can directly view the connection list 142 on the management page 141 so as to realize connection information of other network cards at the same network through the connection list 142.

More specifically, after the network card 1 is powered on and connected to the network system 3, the microprocessor 13 inquires connection information of other network cards on the same network by using a broadcasting manner and receives the connection information replied from the network cards. Accordingly, the network card 1 can build the connection list 142 according to the received connection information. In other words, the number of the connection information in the connection list 142 is equal to the number of the network cards on the network, and also the number of the electronic devices 2.

The major feature of the present disclosure is that the user can first connect to the management page 141 operated by the network card 1 to directly view the connection list 142 on the management page 141 when the user wants to connect to a target network card but lack of connection information of the target network card. As a result, connection information of the target network card can be obtained to connect to the target network card. In other words, the user can connect to all of the network cards on the same network as long as the user realizes connection information of any one network card.

Figure 3:
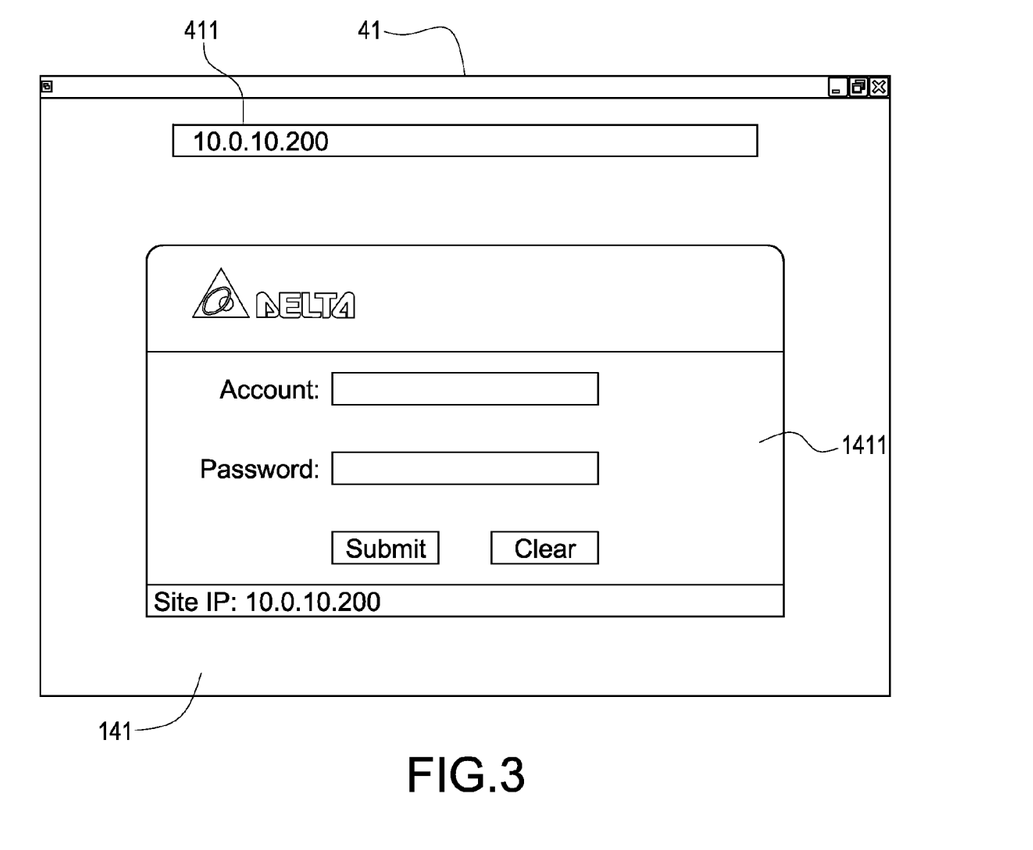
FIG. 3 is a schematic view of a management page according to the first embodiment of the present disclosure.
Figure 4:
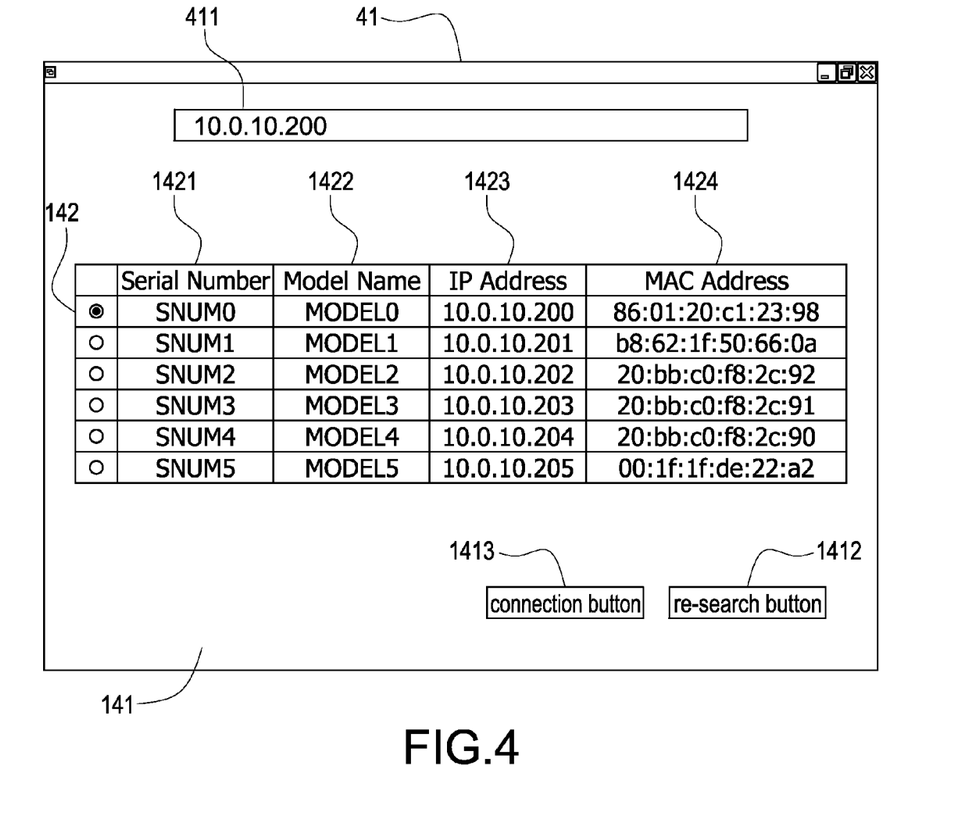
FIG. 4 is a schematic view of a connection list according to the first embodiment of the present disclosure.

Reference is made to FIG. 3 and FIG. 4 which are schematic views of a management page and a connection list according to the first embodiment of the present disclosure, respectively. In this embodiment, the user can open a browser 41 of a user terminal such as a user terminal 4 shown in FIG. 5A and then input the used IP address of the network card 1 in a search field 411 of the browser 41. As shown in FIG. 3, the used IP address of the network card 1 is 10.0.10.200. Accordingly, the user terminal 4 can connect to the management page 141 operated by the network card 1 through the IP address.

As shown in FIG. 3, the management page 141 provides a login window 1411. After connecting to the management page 141, the user can input the correct account and password to login the management page 141. Also, the user can view the connection list 142 on the management page 141. After successfully logining the management page 141, the user can visit the electronic device 2 through the management page 141 so as to inquire and acquire data of the electronic device 2.

As shown in FIG. 4, after the user connects to the management page 141, the network card 1 displays the connection list 142 on the management page 141. In this embodiment, the connection list 142 is displayed below the login window 1411 as shown in FIG. 3. However, the embodiment is only exemplified but is not intended to limit the scope of the disclosure. The connection list 142 mainly records the connection information of all network cards on the same network. Take the FIG. 4 for example, the connection list 142 has six connection information, and that indicates there are six network cards on the same network and the six network cards are corresponding to the six connection information.

Although the user can acquire all connection information of the network cards through the connection list 142, the user usually needs to know the used IP address of at least one network card in actual applications so as to connect to the management page 141 operated by the network card 1 and further to view the connection list 142 on the management page 141. In one embodiment, the network system administrator can set fixed IP addresses for one or more than one network cards when allocating the electronic devices 2, and notify the user of the fixed IP addresses. Accordingly, the user can connect to one of the network cards through the fixed IP address and then view the connection list 142 through the management page 141 operated by the network card 1. Especially, the fixed IP is not restricted to which network card only because functions and priorities of all network cards in the present disclosure.

However, the solution of using fixed IP address connecting to one network card is one embodiment of the present disclosure, but not limited. In other words, the user can use other methods connecting to any one of the network cards. For example, the electronic devices 2 can dynamically allocate available IP addresses by a dynamic host configuration protocol (DHCP) server (not shown). According to different locations or purposes of the electronic devices 2 or different companies of using the electronic devices 2, the DHCP server selects IP addresses from different IP segments such as 10.0.10.200-10.0.10.300 and assigns the selected IP addresses to the electronic devices 2. Accordingly, the user can use one IP address in the IP segments to connect to the management page 141 operated by the network card 1 with the used IP address, and then view the connection list 142 on the management page 141. However, the embodiment is only exemplified but is not intended to limit the scope of the disclosure.

In this embodiment, the connection information includes at least a serial number 1421, a model name 1422, an IP address 1423, and a media access control (MAC) address 1424 corresponding to the network card 1, but not limited. After viewing the connection list 142, the user can judge which connection information is correspondingly connected to the target network card, namely, the target electronic device according to the serial number 1421, the model name 1422, and the MAC address 1424. In addition, after confirming the connection information of the target network card, the user can select the connection information to connect to the management page operated by the network card according to the IP address field 1423 which is used by the target network card.

In the present disclosure, the user terminal 4 can connect to the target network card by a redirection manner or a relay manner. If the redirection manner is used, the user terminal 4 directly connects in redirection to the target network card according to the selected connection information. If the relay manner is used, the network card 1 is the intermediate bypass interface, and the network card 1 is used to transmit data of the user terminal 4 to the target network card and transmit information of the target network card to the user terminal 4 so as to build a connection between the user terminal 4 and the target network card. In other words, the user has to input the correct account and password to login the network card 1 if the relay manner is used to connect the target network card. On the contrary, the user does not need to login the network card 1 if the redirection manner is used.

Further, the user can only connect to the management page 141 without logining the network card 1 to view the connection list 142. However, the embodiments are only exemplified but are not intended to limit the scope of the disclosure.

Especially, in one embodiment, the user can decide that the redirection manner or the relay manner is selected to connect to the target network card after obtaining the connection information of the target network card. In another embodiment, the network card 1 can automatically decide that the redirection manner or the relay manner is selected to connect to the target network card.

The management page 141 provides a re-search button 1412, and the microprocessor 13 of the network card 1 can set operations of executing the re-search button 1412 in advance. When the re-search button 1412 is triggered, the connection information of the network cards on the same network is re-inquired by using the broadcasting manner. After the connection list 142 is updated, the updated connection list 142 is displayed on the management page 141 so as to ensure that the connection information of the connection list 142 is latest.

In another embodiment, the microprocessor 13 can be set to automatically re-inquire the connection information of the network cards on the same network through the broadcasting manner to automatically update the connection list 142 after the user terminal 4 successfully connects or logins to the management page 141. However, the embodiments are only exemplified but are not intended to limit the scope of the disclosure.

The management page 141 further provides a connection button 1413. In one embodiment, the network card 1 can automatically judge whether the user terminal 4 and the target network card are suitable for the redirection manner or only for the relay manner when the user selects any one connection information in the connection list 142 and the connection button 1413 is triggered. If the user terminal 4 and the target network card are on the same network, the user terminal 4 and the target network card can be suitable for the redirection manner. Accordingly, the user terminal 4 can directly connect to the target network card in the redirection manner according to the selected connection information.

On the contrary, if the user terminal 4 and the target network card are not on the same network, only the network card 1 can be used to connect to the target network card in the relay manner because the network card 1 and the target network card are on the same network. Accordingly, the network card 1 executes the relay service to build the connection between the user terminal 4 and the target network card according to the selected connection information. In this embodiment, the network card 1 can execute the relay service for the user terminal 4 after the user terminal 4 correctly logins the network card 1 by the correct user account and the password.

Figure 5A:
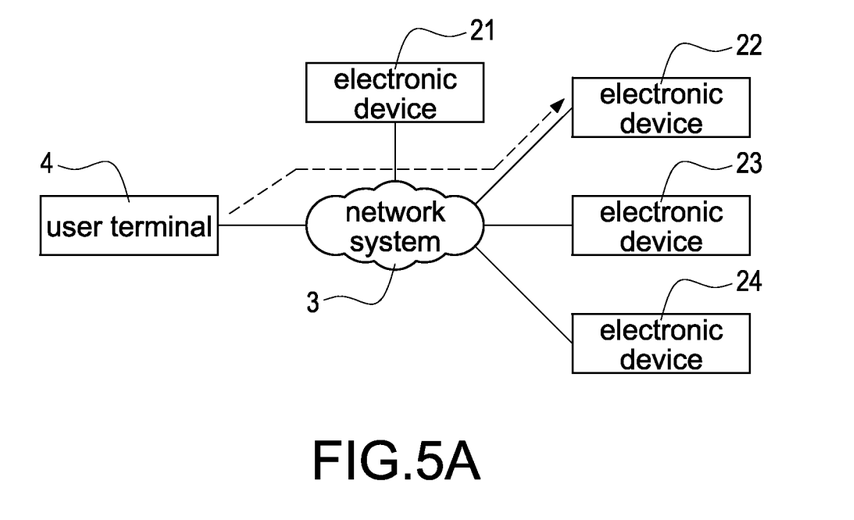
FIG. 5A is a schematic view of a first redirection operation according to the first embodiment of the present disclosure.
Figure 5B:
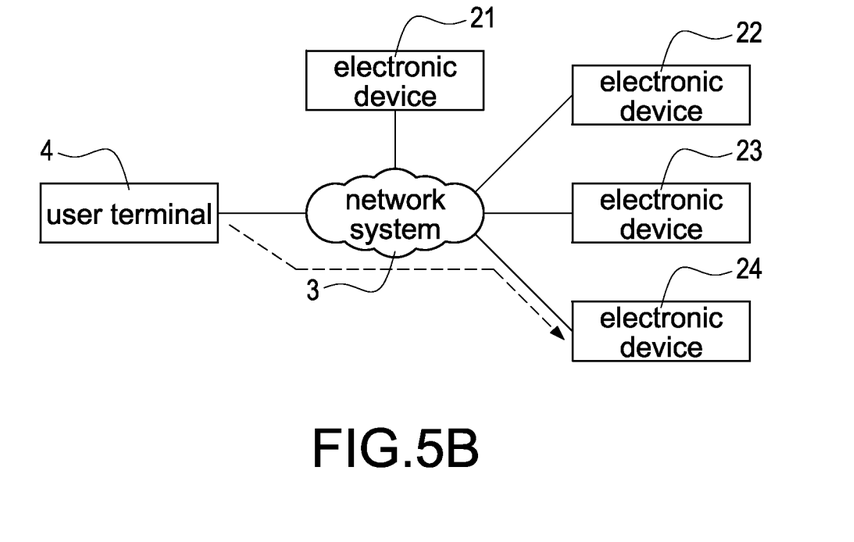
FIG. 5B is a schematic view of a second redirection operation according to the first embodiment of the present disclosure.

Reference is made to FIG. 5A and FIG. 5B which are schematic views of a first redirection operation and a second redirection operation according to the first embodiment of the present disclosure, respectively. In this embodiment, four electronic devices 21-24 are in the network system 3. Also, each electronic device 21-24 has one network card 1 of the present disclosure, and the used IP addresses are IP1 to IP4 for the four electronic devices 21-24, respectively. In this embodiment, it is assumed that the user uses the user terminal 4 to connect to the electronic device 24, and the used IP address is IP2 (fixed IP address) for the electronic device 22 and the used IP address is unknown for the electronic device 24. Hence, the user terminal 4 uses the fixed IP address IP2 to connect to the management page 141 of the electronic device 22 and the connection list 142 can be viewed on the management page 141.

Afterward, as shown in FIG. 5B, the user can realize that the used IP address for the electronic device 24 is IP4 through the connection list 142. In this embodiment, the user terminal 4 and the electronic device 24 are in the same network system 3. Accordingly, the user terminal 4 can use the IP address IP4 to connect to the management page 141 of the electronic device 24 by the redirection manner. After successfully logining the management page 141, the user terminal 4 can be communicated with the electronic device 24. Especially, the user can inquire the connection list 142 on the management page 141 after the user terminal 4 is successfully connected to the management page 141 of the electronic device 24 so that the user can connect to other electronic devices 21, 23 by the redirection manner.

Figure 6A:
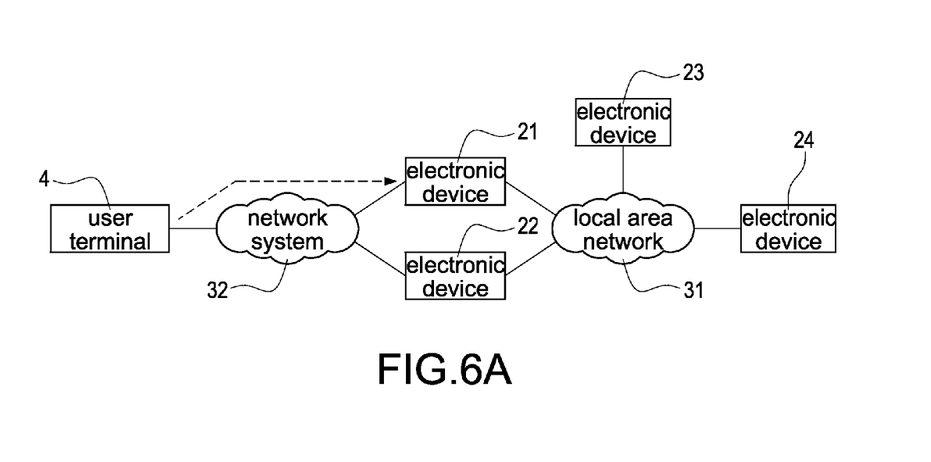
FIG. 6A is a schematic view of a first relay operation according to the first embodiment of the present disclosure.
Figure 6B:
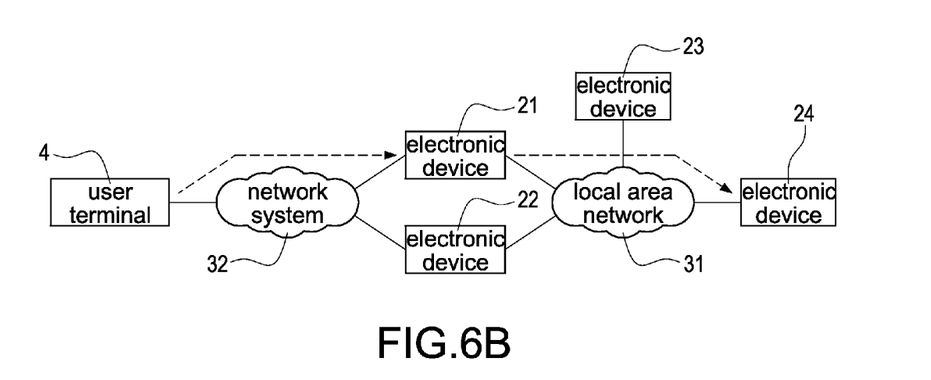
FIG. 6B is a schematic view of a second relay operation according to the first embodiment of the present disclosure.

Reference is made to FIG. 6A and FIG. 6B which are schematic views of a first relay operation and a second relay operation according to the first embodiment of the present disclosure, respectively. In this embodiment, the four electronic devices 21-24 are connected to the same local area network 31, and the electronic devices 21-22 are further connected to an external Internet 32. Because the electronic devices 23-24 are only connected to the local area network 31 and the user terminal 4 is not connected to the local area network 31, the user cannot use the user terminal 4 to directly connect to the electronic devices 23-24 even though the user realizes the used IP addresses of the electronic devices 23-24.

In this embodiment, if the user realizes that the used IP address for the electronic device 21 is IP1, the user can operate the user terminal 4 to connect to the management page 141 of the electronic device 21 through the Internet 32. Also, the connection list 142 can be directly viewed on the management page 141 of the electronic device 21.

Afterward, as shown in FIG. 6B, the user logins the management page 141 of the electronic device 21, and then selects the connection information in the connection list 142 corresponding to the electronic device 24. The network card 1 of the electronic device 21 can execute the relay service according to the selected connection information after the user pushes the connection button 1413. Accordingly, the user terminal 4 can connect to the electronic device 24 and communicate to each other through the logined electronic device 21. In this embodiment, the electronic device 24 is the above-mentioned target electronic device with the target network card.

In the present disclosure, the user terminal 4 is connected to the target network card after the connection button 1413 on the management page 141 is triggered. In one preferred embodiment, the network card 1 can automatically judge whether the user terminal 4 can directly connect to the target network card. If the user terminal 4 can directly connect to the target network card, the user terminal 4 is directly connected to the target network card by the redirection manner according to the selected connection information after the connection button 1413 is triggered. On the contrary, if the user terminal 4 cannot directly connect to the target network card, the network card 1 executes the relay service to build the connection between the user terminal 4 and the target network card according to the selected connection information after the connection button 1413 is triggered.

Figure 7:
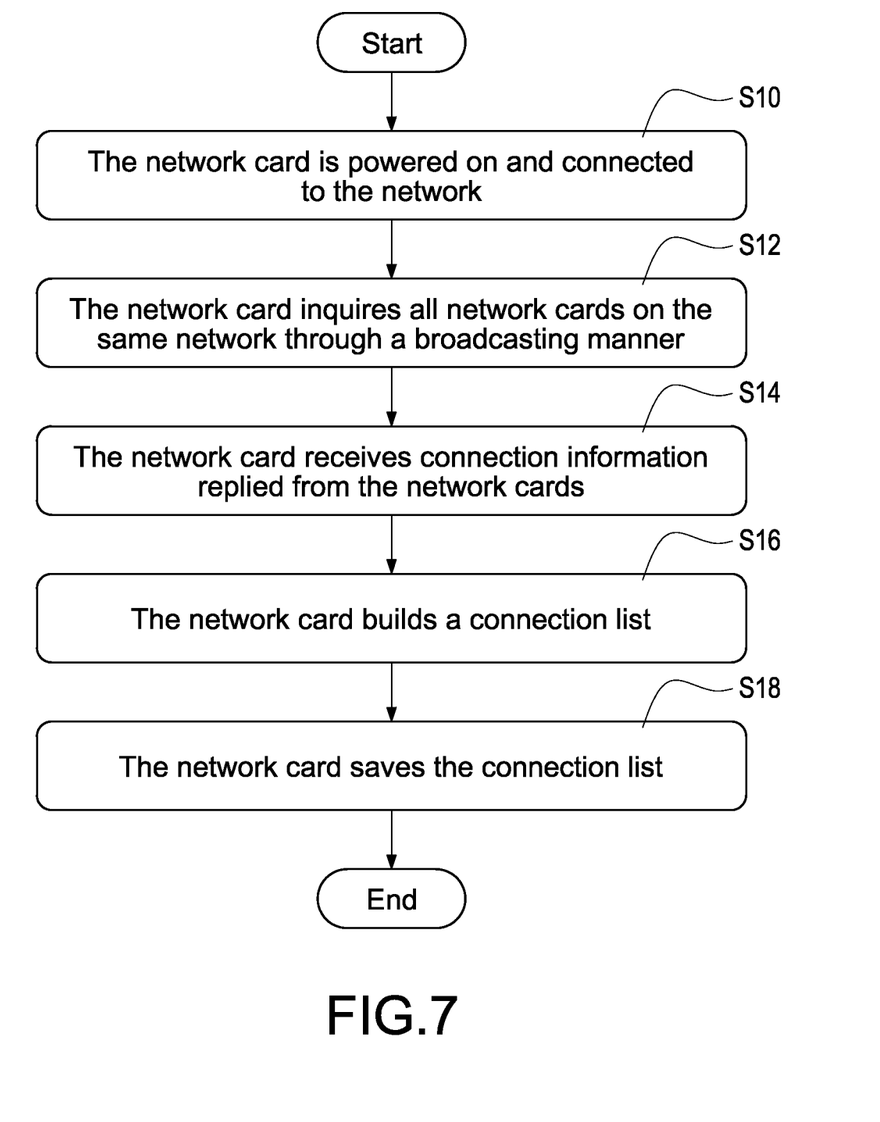
FIG. 7 is a flowchart of a method of building the connection list according to the first embodiment of the present disclosure.

Reference is made to FIG. 7 which is a flowchart of a method of building the connection list according to the first embodiment of the present disclosure. In this present disclosure, the network card 1 is powered on and connected to the network (S10). For example, the network card 1 is installed in the electronic device 2 and the electronic device 2 is powered on. Also, the electronic device 2 is inserted into a server cabinet and connected to a network switch in the server cabinet. Afterward, the network card 1 automatically inquires all network cards on the same network through a broadcasting manner (S12) and receives connection information replied from the network cards (S14). Accordingly, the network card 1 can build a connection list 142 (S16) and save the connection list 142 (S18) according to the received connection information.

Figure 8:
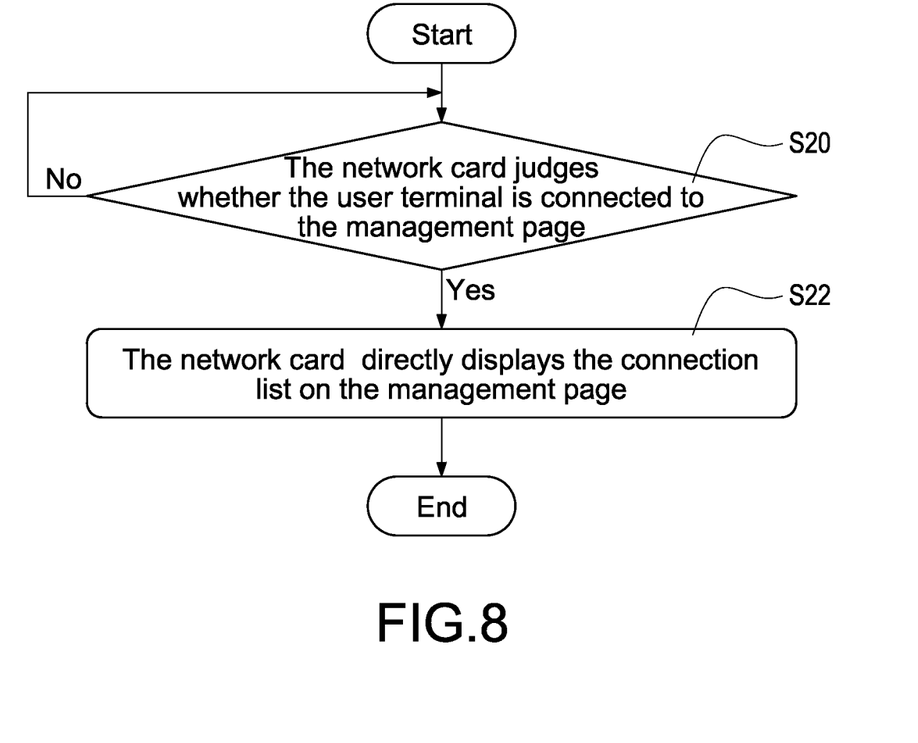
FIG. 8 is a flowchart of a method of displaying the connection list according to the first embodiment of the present disclosure.

Reference is made to FIG. 8 which is a flowchart of a method of displaying the connection list according to the first embodiment of the present disclosure. As mentioned above, the network card 1 saves the connection list 142 by the memory 14 and the network card 1 judges whether any one user terminal 4 is connected to the management page 141 (S20). If any one user terminal 4 is connected to the management page 141, the network card 1 directly displays the connection list 142 on the management page 141 (S22) and the connection list 142 is viewed on the management page 141 by the user terminal 4.

Figure 9:
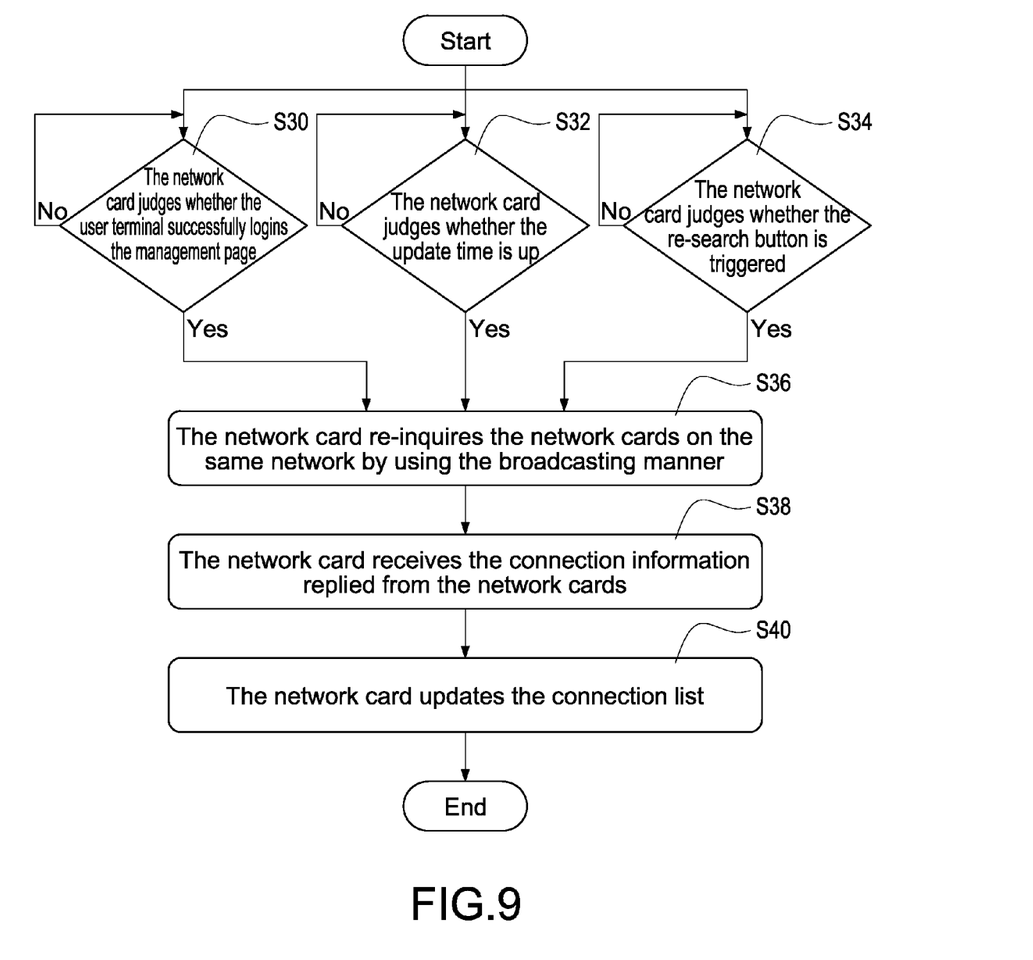
FIG. 9 is a flowchart of a method of updating the connection list according to the first embodiment of the present disclosure.

Reference is made to FIG. 9 which is a flowchart of a method of updating the connection list according to the first embodiment of the present disclosure. In one embodiment, the network card 1 continually judges whether the user terminal 4 successfully logins the management page 141 (S30). If the user terminal 4 successfully logins the management page 141, the connection list 142 is updated. In another embodiment, the network card 1 can pre-set an update time, such as thirty seconds, three minutes, thirty minutes, or one hour, but not limited. The network card 1 continually judges whether the update time is up (S32) and automatically update the connection list 142 when the update time is up.

In further another embodiment, the network card 1 can provide the re-search button 1412 through the management page 141 and the network card 1 continually judges whether the re-search button 1412 is triggered (S34). If the re-search button 1412 is triggered, the network card 1 updates the connection list 142. Especially, the management page 141 can continually provide the re-search button 1412 thereon or provide the re-search button 1412 after the user terminal 4 successfully logins. The above-mentioned three conditions of updating the connection list 142 are the preferred embodiments; however, the embodiments are only exemplified but are not intended to limit the scope of the disclosure.

When the conditions in step (S30), step (32), or step (34) are achieved, the network card 1 can re-inquire the network cards on the same network by using the broadcasting manner (S36), and the network card 1 receives the connection information replied from the network cards (S38). Accordingly, the network card 1 can update the connection list 142 (S40) according to the received connection information, and the updated connection list 142 is displayed on the management page 141.

Figure 10:
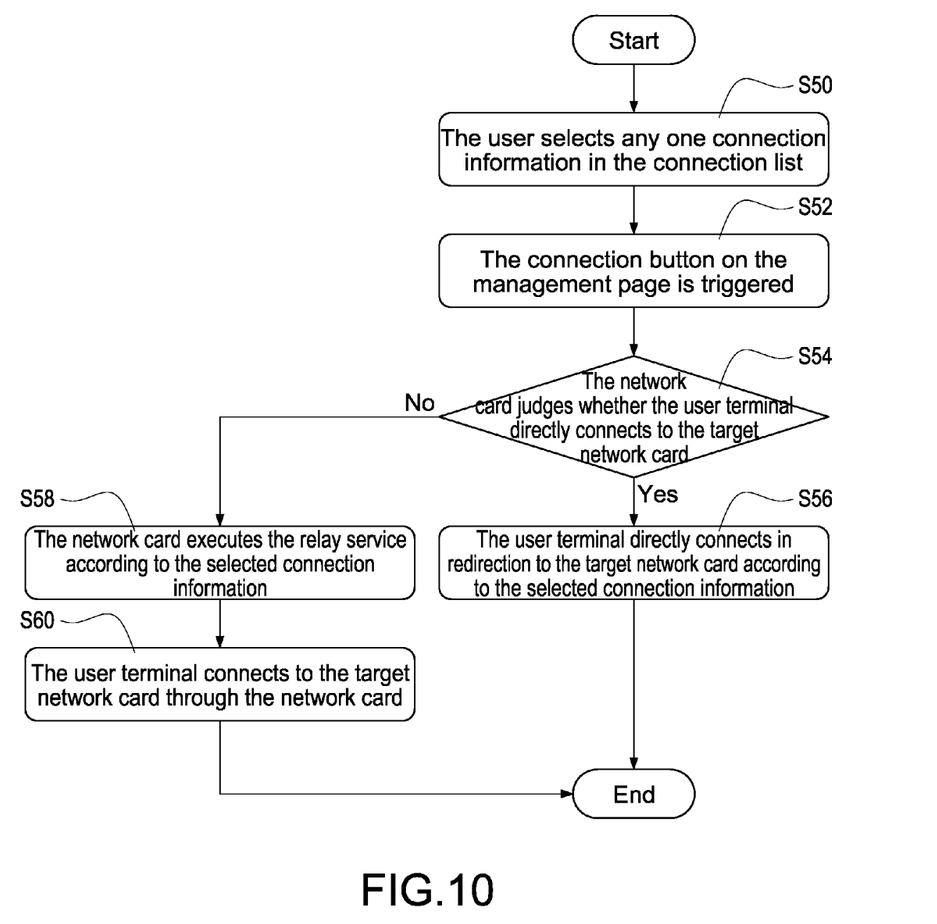
FIG. 10 is a flowchart of a method of executing a connection according to the first embodiment of the present disclosure.

Reference is made to FIG. 10 which is a flowchart of a method of executing a connection according to the first embodiment of the present disclosure. After the user terminal 4 views the connection list 142 on the management page 141, the user can select any one connection information in the connection list 142 (S50), and the selected connection information is corresponding to a target network card. Afterward, the connection button 1413 on the management page 141 is triggered (S52). After the connection button 1413 is triggered, the network card 1 judge whether the user terminal 4 can directly connect to the target network card (S54).

If the user terminal 4 can directly connect to the target network card, the user terminal 4 can directly connect in redirection to the target network card according to the selected connection information (S56). In particular, the user terminal 4 can directly execute the redirection service in step (S56) without logining the management page 141 of the network card 1.

On the contrary, if the user terminal 4 cannot directly connect to the target network card, the network card 1 executes the relay service according to the selected connection information (S58) so that the user terminal 4 can connect to the target network card through the network card 1 (S60). In particular, the user terminal 4 has to login the network card 1 before the network card 1 executes the relay service. Especially, the user terminal 4 cannot directly connect to the target network card means that the user has insufficient privileges, the user terminal 4 and the target network card are not on the same network, or the target network card is only connected to the local area network and is not opened.

Especially, the relay service means that the network card 1 is provided to only bypass data to the target network card, and receives the data replied from the target network card and bypass the received data to the user terminal 4. That is, the network card 1 does not involve data sharing, such as synchronizing data of the network card 1 and the target network card, and not involve account integration, such as automatically logining the target network card for the user.

Figure 11:
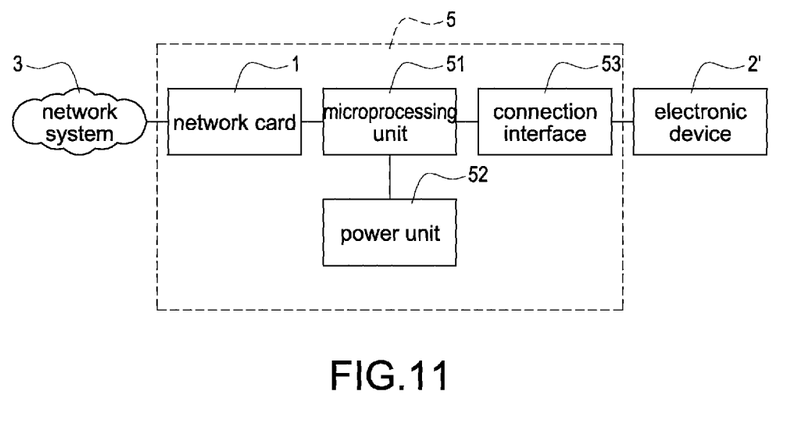
FIG. 11 is a schematic view of a monitoring device according to the first embodiment of the present disclosure.
Figure 12:
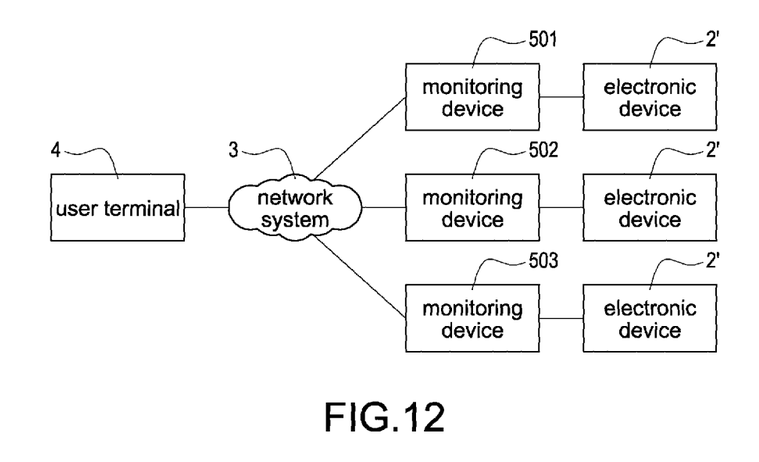
FIG. 12 is a schematic view of connecting the monitoring device according to the first embodiment of the present disclosure.

Reference is made to FIG. 11 and FIG. 12 which are schematic views of a monitoring device and connecting the monitoring device according to the first embodiment of the present disclosure. In the present disclosure, a monitoring device 5 with the network card 1 is further disclosed. As shown in FIG. 11, the monitoring device 5 mainly includes a microprocessing unit 51, a power unit 52, a connection interface 53, and the network card 1. In particular, the power unit 52, the connection interface 53, and the network card 1 are electrically connected to the microprocessing unit 51.

In this embodiment, the monitoring device 5 is a server host, which is inserted in a server cabinet (not shown), and is connected to at least one electronic device 2' so as to monitor and acquire data of the electronic device 2'. The electronic device 2' can be an uninterruptible power supply (UPS) or an inverter. The monitoring device 5 monitors operation conditions of the electronic device 2' and acquires power information of the electronic device 2' according to users' demands. However, the embodiment is only exemplified but is not intended to limit the scope of the disclosure.

The microprocessing unit 51 is provided to control and integrate execution and transmission of internal data and instructions. The power unit 52 is electrically connected to the microprocessing unit 51 to provide the required power for operating the monitoring device 5. The connection interface 53 is electrically connected to the microprocessing unit 51, and the monitoring device 5 is electrically connected to the electronic device 2' through the connection interface 53. In this embodiment, the connection interface 53 can be a RS-485 interface or an intelligent platform management interface (IPMI), but not limited.

The network card 1 is electrically connected to the microprocessing unit 51, and the monitoring device 5 is connected to the network system 3 through the network card 1. The network card 1 is identical to the network card as shown in FIG. 2, and includes the microprocessor 13, the network connector 15, and the memory 14. In particular, the network connector 15 is used to connect to the network system 3 and the memory 14 is used to record the management page 141 and the connection list 142. The major difference between the two embodiments is that the interface port 12 of the network card 1 in this embodiment is electrically connected to the monitoring device 5, namely, the microprocessing unit 51.

In this embodiment, the network card 1 receives the required power of operating thereof from the power unit 52 and provides the networking function for the monitoring device 5. After the network card 1 is powered on, namely, the monitoring device 5 is powered on, and connected to the network system 3, the microprocessor 13 of the network card 1 inquires connection information of all network cards on the same network by using the broadcasting manner and receives the connection information replied from the network cards. Accordingly, the network card 1 can build the connection list 142 according to the received connection information.

The user terminal 4 can open a browser 41 input the used IP address of the network card 1, namely, the used IP address by the monitoring device 5 so as to connect to the management page 141 operated by the network card 1. Also, the user terminal 4 can directly inquire the network card 1 on the management page 141 and build the connection list 142. Accordingly, the user can connect to the target network card by the redirection manner or the relay manner according to the connection information recorded in the connection list 142. Also, the user can communicate with the monitoring device with the target network card after logining the target network card.

As shown in FIG. 12, three monitoring devices 501-503 are installed in the network system 3. The used IP addresses for the three monitoring devices 501-503 are IP1-IP3, respectively, and each of the three monitoring devices 501-503 is correspondingly connected to an electronic device 2'. After the user realizes connection information of any one monitoring device 501-503 through the connection list 142, the user can login the target network card by the redirection manner or the relay manner so as to communicate with a target monitoring device with the target network card and inquire data of the electronic device 2' connected to the target monitoring device.

In the present disclosure, the user can easily find the connection information of the target network card without recording the IP addresses of the used network cards as long as the user connects to the management page operated by the network card and then inquires the connection list 142. Further, the redirection manner or the relay manner can be used to easily connect to the target network card and further communicate with the electronic device or the monitoring device with the target network card. Accordingly, it is convenient and helpful for the network administrator to address, manage, and inquire the large number of devices in the network system.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A network card with searching ability installed in an electronic device and configured to provide a networking function for the electronic device, the network card comprising:
   a microprocessor;
   a network connector electrically connected to the microprocessor, and the network card connected to a network through the network connector;
   an interface port electrically connected to the microprocessor, and the network card connected to the electronic device through the interface port; and
   a memory electrically connected to the microprocessor, and configured to record a management page and a connection list;
   wherein
      the microprocessor is configured to inquire connection information of all network cards on the same network by using a broadcasting manner to build the connection list and display the connection list on the management page after the network card is powered on and connected to the network, and
      the connection list at least comprises the connection information of a target network card, and the microprocessor is configured to determine if a connected user terminal and the target network card are suitable for a connection through a redirection service or only for a relay service according to the connection information of the target network.

2. The network card with searching ability in claim 1, wherein the management page is a web-based webpage; the management page is connected by the user terminal and is configured to display the connection list thereon; wherein the connection list is configured to record at least one connection information, and the number of the connection information in the connection list is equal to the number of the network cards on the same network.

3. The network card with searching ability in claim 2, wherein the connection information includes at least a serial number, a model name, an IP address, and a media access control (MAC) address.

4. The network card with searching ability in claim 2, wherein the microprocessor is configured to re-inquire the connection information of the network cards on the same network to update the connection list after the user terminal is configured to successfully login the management page.

5. The network card with searching ability in claim 2, wherein the management page is configured to provide a re-search button; the microprocessor is configured to re-inquire the connection information of the network cards on the same network to update the connection list after the re-search button is triggered.

6. The network card with searching ability in claim 2, wherein the user terminal is configured to select one connection information provided by the connection list to be the connection information of the target network card; the management page is configured to provide a connection button, and the network card is configured to execute the relay service to transmit data between the user terminal and the target network card to build the connection between the user terminal and the target network card according to the selected connection information when the connection button is triggered.

7. The network card with searching ability in claim 2, wherein the user terminal is configured to select one connection information provided by the connection list to be the connection information of the target network card; the management page is configured to provide a connection button, and the network card is configured to execute the redirection service according to the selected connection information when the connection button is triggered and the user terminal is configured to connect in redirection to the target network card.

8. The network card with searching ability in claim 1, wherein the network connector is a RJ-45 connector; the network card is a simple network management protocol (SNMP) card.

9. A monitoring device connected to an electronic device and configured to monitor data of the electronic device, the monitoring device comprising:
   a microprocessing unit;
   a connection interface electrically connected to the microprocessing unit, and the monitoring device electrically connected to the electronic device through the connection interface;
   a power unit electrically connected to the microprocessing unit; and
   a network card electrically connected to the microprocessing unit, and configured to receive electricity power provided from the power unit and provide a networking function for the monitoring device, the network card comprising:
   a microprocessor;
   a network connector electrically connected to the microprocessor, and the network card connected to a network through the network connector;
   an interface port electrically connected to the microprocessor, and the network card connected to the monitoring device through the interface port; and
   a memory electrically connected to the microprocessor, and configured to record a management page and a connection list;
   wherein
      the microprocessor is configured to inquire connection information of all network cards on the same network by using a broadcasting manner to build the connection list and display the connection list on the management page after the monitoring device is powered on and connected to the network, and
      the connection list at least comprises the connection information of a target network card, and the microprocessor is configured to determine if a connected user terminal and the target network card are suitable for a connection through a redirection service or only for a relay service according to the connection information of the target network.

10. The monitoring device in claim 9, wherein the management page is a web-based webpage; the management page is connected by the user terminal and is configured to display the connection list thereon; wherein the connection list is configured to record at least one connection information, and the number of the connection information in the connection list is equal to the number of the network cards on the same network.

11. The monitoring device in claim 10, wherein the connection information includes at least a serial number, a model name, an IP address, and a media access control (MAC) address.

12. The monitoring device in claim 10, wherein the microprocessor is configured to re-inquire the connection information of the network cards on the same network to update the connection list after the user terminal is configured to successfully login the management page.

13. The monitoring device in claim 10, wherein the management page is configured to provide a re-search button; the microprocessor is configured to re-inquire the connection information of the network cards on the same network to update the connection list after the re-search button is triggered.

14. The monitoring device in claim 10, wherein the user terminal is configured to select one connection information provided by the connection list to be the connection information of the target network card; the management page is configured to provide a connection button, and the network card is configured to execute the relay service to transmit data between the user terminal and the target network card to build the connection between the user terminal and the target network card according to the selected connection information when the connection button is triggered.

15. The monitoring device in claim 10, wherein the user terminal is configured to select one connection information provided by the connection list to be the connection information of the target network card; the management page is configured to provide a connection button, and the network card is configured to execute the redirection service according to the selected connection information when the connection button is triggered and the user terminal is configured to connect in redirection to the target network card.

16. The monitoring device in claim 9, wherein the connection interface is a RS-485 interface or an intelligent platform management interface (IPMI); the electronic device is a uninterruptible power supply (UPS) or an inverter.

17. A searching method applied to a network card with searching ability, the method comprising:
 (a) inquiring connection information of all network cards on the same network by using a broadcasting manner after the network card is powered on and connected to a network;
 (b) receiving the connection information replied from the network cards;
 (c) building a connection list according to the received connection information;
 (d) providing a management page by the network card, and displaying the connection list on the management page after a user terminal is connected to the management page, wherein the connection list is configured to record at least one connection information of a target network card, and the number of the connection information in the connection list is equal to the number of the network cards on the same network; and
 e) determining if the connected user terminal and the target network card are suitable for a connection through a redirection service or only for a relay service according to the connection information of the target network.

18. The searching method in claim 17, wherein the step (d) further comprising:
 (d1) judging whether the user terminal successfully logins the management page;
 (d2) re-inquiring connection information of all network cards on the same network by using the broadcasting manner by the network card if the user terminal successfully logins the management page;
 (d3) updating the connection list according to the received connection information; and
 (d4) displaying the updated connection list on the management page.

19. The searching method in claim 17, wherein the management page is configured to provide a re-search button; the searching method further comprising following steps:
 (f) judging whether the re-search button is triggered;
 (g) re-inquiring connection information of all network cards on the same network by using the broadcasting manner by the network card if the re-search button is triggered;
 (h) updating the connection list according to the received connection information; and
 (i) displaying the updated connection list on the management page.

20. The searching method in claim 17, further comprising following steps:
 (f) selecting one connection information in the connection list;
 (g) triggering a connection button on the management page;
 (h) judging whether the user terminal can directly connect to the target network card corresponding to the selected connection information;
 (i) directly connecting in redirection to the target network card if the user terminal can directly connect to a target network card corresponding to the selected connection information;
 (j) executing the relay service according to the selected connection information if the user terminal cannot directly connect to a target network card corresponding to the selected connection information; and
 (k) connecting the user terminal to the target network card through the logined network card.

* * * * *